(12) United States Patent
Killian et al.

(10) Patent No.: US 9,767,442 B2
(45) Date of Patent: Sep. 19, 2017

(54) MONEY TRANSFER SYSTEM GATEWAY SERVICE

(71) Applicant: MasterCard International Incorporated, Purchase, NY (US)

(72) Inventors: Patrick Killian, Cottleville, MO (US); Sandeep Malhotra, Singapore (SG)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 146 days.

(21) Appl. No.: 14/535,698

(22) Filed: Nov. 7, 2014

(65) Prior Publication Data

US 2015/0066756 A1  Mar. 5, 2015

Related U.S. Application Data

(63) Continuation of application No. 13/005,872, filed on Jan. 13, 2011, now abandoned.

(Continued)

(51) Int. Cl.
  *G06Q 40/02*  (2012.01)
  *G06Q 20/02*  (2012.01)
  (Continued)

(52) U.S. Cl.
  CPC ......... *G06Q 20/027* (2013.01); *G06Q 20/102* (2013.01); *G06Q 20/20* (2013.01); *G06Q 20/32* (2013.01); *G06Q 20/40* (2013.01)

(58) Field of Classification Search
  CPC ........... G06Q 40/02; G06Q 20/04; G07F 7/08
  (Continued)

(56) References Cited

U.S. PATENT DOCUMENTS 7,292,999 B2 * 11/2007 Hobson ................. G06Q 20/02
  705/64
2010/0010918 A1  1/2010 Hunt
  (Continued)

OTHER PUBLICATIONS

A guide to prepaid cards for transit agencies. Smart Card Alliance. Feb. 2011.*

(Continued)

*Primary Examiner* — Alexander Kalinowski
*Assistant Examiner* — John Preston
(74) *Attorney, Agent, or Firm* — Buckley, Maschoff & Talwalkar LLC

(57) ABSTRACT

Systems and methods for person-to-person and person-to-merchant remittances from a person having a closed loop system account to merchants who are not members of the closed loop system. In an embodiment, a payment gateway computer receives a remittance transaction request from a payment services provider (PSP) computer associated with a closed-loop system, maps an alias identifier into a shadow account number assigned to the sender in an open-loop payment authorization system, determines that the alias identifier mapped into a valid shadow account number, debits a stored value account for the remittance transaction amount, credits a shadow account in the open-loop payment authorization system for the remittance transaction amount, generates an authorization request for an open-loop payment transaction and transmits it to the open-loop payment authorization system, receives an authorization response from the open-loop payment authorization system, and transmits an approval response.

16 Claims, 9 Drawing Sheets

Related U.S. Application Data

(60) Provisional application No. 61/364,934, filed on Jul. 16, 2010.

(51) Int. Cl.
  *G06Q 20/20* (2012.01)
  *G06Q 20/32* (2012.01)
  *G06Q 20/40* (2012.01)
  *G06Q 20/10* (2012.01)

(58) Field of Classification Search
  USPC ............................................. 235/379
  See application file for complete search history.

(56) References Cited

U.S. PATENT DOCUMENTS

2010/0076892 A1* 3/2010 Babi ................. G06Q 20/023
                                                    705/44
2012/0011025 A1* 1/2012 Hunt ................. G06Q 20/102
                                                    705/26.41

OTHER PUBLICATIONS

Money laundering risks of prepaid stored value cards. Kim-Kwang, Raymond Choo. Sep. 2008.*
Money laundering and terrorism financing risks of prepaid cards instruments? Asian Criminology. Kim-Kwang, Raymond Choo. May 2008.*
"Mexican Substantive Examination Report" dated Apr. 24, 2015 for Mexican Patent Application No. MX/a/2013/000603, 6 pages.
"English-language Translation of Mexican Substantive Examination Report" dated Apr. 24, 2015 for Mexican Patent Application No. MX/a/2013/000603, 6 pages.
"Mexican Substantive Examination Report" dated Oct. 6, 2014 for Mexican Patent Application No. MX/a/2013/000603, 3 pages, along with unofficial English translation.

* cited by examiner

MONEY TRANSFER SYSTEM GATEWAY SERVICE

CROSS-REFERENCE TO RELATED APPLICATION

This application claims the benefit of U.S. Provisional Patent Application No. 61/364,934, filed Jul. 16, 2010, and U.S. patent application Ser. No. 13/005,872, filed Jan. 13, 2011, which applications are incorporated by reference herein.

BACKGROUND

Embodiments disclosed herein relate to payment systems. In particular, some embodiments relate to methods, apparatus, systems, means and computer program products for interconnecting "closed loop" payment systems with "open loop" payment systems.

Payment card systems are in widespread use. A prominent payment card system is operated by the assignee hereof, MasterCard International Incorporated, and by its member financial institutions. The MasterCard payment card system and similar systems are sometimes referred to as "open loop" systems because transfers via the system may occur between two financial institutions (serving respective customers) that do not have a contractual relationship with each other but rather are members of the system. Thus transactions may travel within the system from an account at one FI (financial institution) via the system to an account at another FI, and not directly from one institution to the other. Accordingly a transaction between two end users does not require both users to be customers of the same payment service provider, and the system is "open" to any customer of any FI that is a member of the system.

A typical purchase transaction in an open loop payment system will now be described. To initiate the transaction, a customer visits a retail store operated by a merchant, selects goods that he/she wishes to purchase, carries the goods to the merchant's point of sale terminal, and presents his/her payment card to the point of sale terminal. The point of sale terminal reads the customer's payment card account number from the payment card, and then sends an authorization request to an acquirer financial institution (FI) with which the merchant has a relationship. The authorization request includes the payment card account number and the amount of the transaction, among other information. The authorization request is routed via the payment card system (which may be, for example, the well-known Banknet system operated by the assignee hereof) from the acquirer FI to the issuer FI that issued the customer's payment card.

Assuming that all is in order, the issuer FI transmits a favorable authorization response to the merchant's point of sale terminal through the payment card system and via the acquirer FI. The transaction at the point of sale terminal is then completed and the customer leaves the store with the goods. A subsequent clearing transaction initiated by the merchant results in a transfer of the transaction amount from the customer's payment card account to an account that belongs to the merchant and that is maintained at the acquirer FI. The customer's payment card account may be, for example, either a debit card account or a credit card account. In the former case, the clearing transaction results in the funds being debited directly from the account. In the latter case, the clearing transaction results in a charge being posted against the account, and the charge subsequently appears on the customer's monthly credit card statement.

The foregoing description of the typical transaction may be considered to be somewhat simplified in some respects. For example, a so-called merchant processing system (not shown) may be interposed between the POS terminal and the acquirer FI. As is familiar to those who are skilled in the art, a merchant processing system may be operated by or on behalf of the merchant to form part of the communications path between the acquirer FI and a considerable number of POS terminals operated by the merchant. It is also often the case that a third party transaction processing service may operate to handle payment card transactions on behalf of the acquirer and on behalf of a large number of other like financial institutions.

While so-called open loop payment systems are a prevailing mode of handling transactions in the United States and other highly developed countries, "closed loop" systems may also play a role in those countries, and are often quite important in less developed countries. In a closed loop system, all customers in the system have accounts with a single payment services provider (which may be a bank) or with a small number of cooperating payment services providers. In these systems, purchase or payment transactions involve direct transfers between customers' accounts that are issued by the payment services provider. Heretofore, payment systems have not supported transfers from a closed loop system account to an open loop system account. As a result, the usefulness of closed loop systems has been somewhat limited.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein.

DETAILED DESCRIPTION

Figure 1:
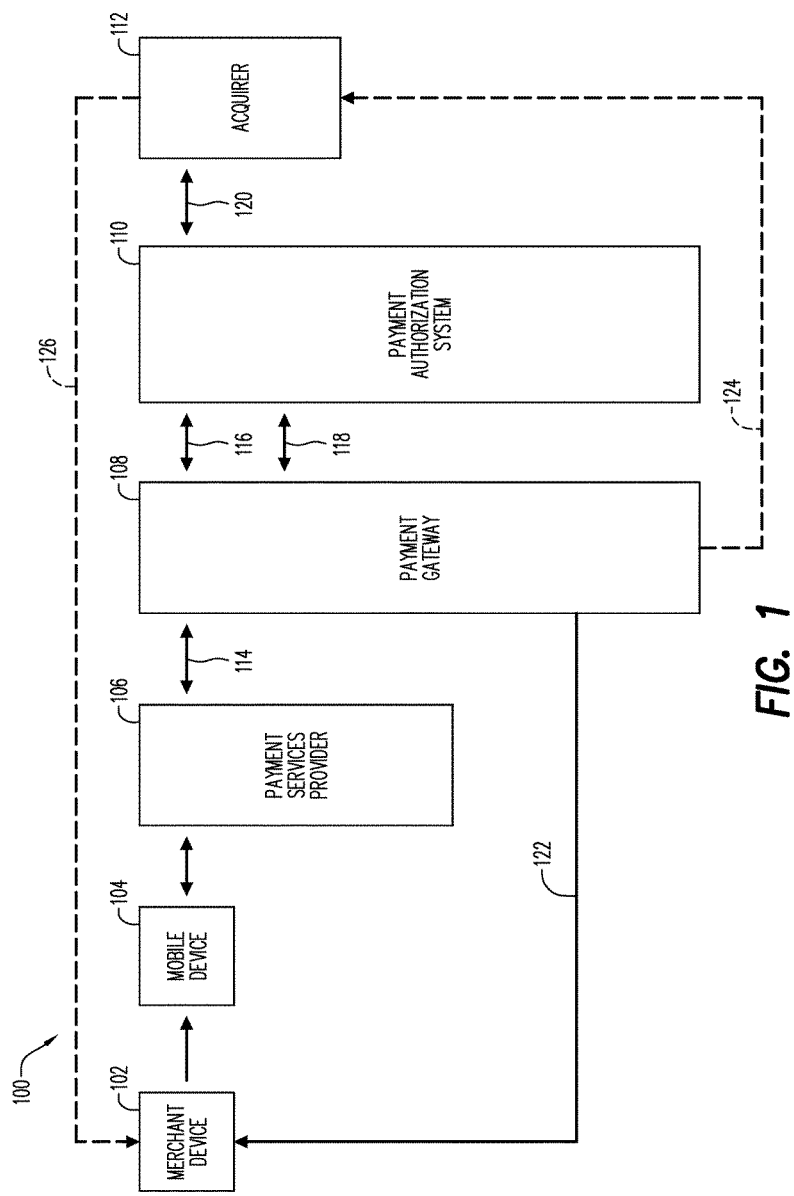
FIG. 1 is a block diagram that illustrates a transaction-handling system in accordance with aspects of the present invention.

In general, and for the purpose of introducing concepts of embodiments of the present invention, a payment gateway service provides an interconnection between a closed loop payment system and an open loop payment system. A user of the closed loop system may establish a shadow account with the open loop system that the user can access via the closed loop system. For example, in a typical transaction, the user may request that the closed loop system facilitate a purchase transaction with a merchant that is not a member of the closed loop system. It may be assumed that, like most merchants, the merchant in question has a relationship with an acquirer bank such that the merchant is enabled to accept payments in the open loop system. In requesting the transaction, the user may operate a mobile device to communicate with the closed loop system. The request/communication may identify the user by his/her closed loop account identifier (or the user may be automatically identified to the closed loop system) and may also identify the merchant to whom payment is to be made, as well as the amount of the transaction.

The closed loop system (a/k/a, "payment services provider") may then transmit a transaction request to the payment gateway. A transfer of funds to support the requested transaction may take place from the user's closed loop system account to the shadow account that is accessible in the open loop system. The payment gateway (acting as a proxy for the merchant) may initiate a largely conventional open loop system transaction authorization request to the acquirer bank for the indicated merchant. The transaction authorization request may identify the user's open loop shadow account as the account to be charged for the transaction. The transaction authorization request may be forwarded through the open loop payment system from the acquirer bank back to the payment gateway, in its role as a proxy for the customer account issuer FI. In the payment system and/or the payment gateway, business rules may be applied to determine whether the transaction should be approved. If approval is granted, the payment gateway may charge the transaction to the user's shadow (open loop system) account, and may issue a transaction authorization response back to the open loop payment system. The transaction authorization response may be returned from the open loop payment system to the payment gateway, now acting as a proxy for the merchant. The merchant may be informed of the approval of the transaction either directly from the payment gateway or via the payment services provider. In the latter case, or otherwise, the payment gateway may inform the payment services provider of the approval of the transaction, and the payment services provider may then provide a suitable notification to the user mobile device that the transaction has been completed.

In cases where the transaction is declined, the funds transfer from the user's closed loop system account to the shadow account may be reversed.

With this arrangement, a user who has an account in a closed loop system is permitted to use his/her closed loop system account to initiate a payment to a merchant who is not a member of the closed loop system. Thus the usefulness of the user's closed loop system account is greatly increased.

Further, the routing of the open loop transaction authorization request through the merchant's acquirer into the open loop system facilitates payment and settlement to the merchant, while enabling application to the transaction of the conventional transaction chargeback procedures, accounting, dispute management, exception management and other functional features provided by the open loop system.

FIG. 1 is a block diagram that illustrates a transaction process in accordance with aspects of the present invention. The various components shown in FIG. 1, and discussed below, may be a subset of a larger system, indicated generally by reference numeral 100, for facilitating payments to merchants utilizing closed loop system accounts in systems in which the merchants are not members. In the example embodiment illustrated in FIG. 1, only components of system 100 that operate with respect to a single transaction are shown.

The system 100 includes a merchant device 102, which may for example be a POS terminal or a suitably programmed mobile telephone or a PDA (personal digital assistant) or a personal computing device with communication capabilities. (The latter two possible embodiments of the merchant device may for example be particularly appropriate for merchants who operate without a fixed place of business.) If the merchant device is a POS terminal, the latter may be operable in a conventional manner while also providing functionality that contributes to the novel transaction flow illustrated in FIG. 1. The POS terminal may be operated in any type of business establishment or retail store, including a "mom and pop" operation all the way up to a big box store that is part of a mega retail chain.

Among other capabilities, the merchant device 102 may display transaction information to be read by the customer (not shown) and manually inputted by the customer into his/her mobile device 104. For example, the merchant device may display the total amount due for the transaction, and a merchant identification number. Alternatively, the merchant ID may be permanently displayed on a sticker affixed to the merchant device 102. In other embodiments, the merchant device 102 may have capabilities for transmitting the transaction information to the customer device 104. The transmitting of the transaction information from the merchant device 102 to the customer device 104 may be via wireless communication such as NFC (near field communication) or alternatively may be via a mobile telephone network using text messaging or the like.

The customer's mobile device 104 may for example be a mobile telephone with capabilities for initiating payment transactions vis a vis a closed loop system payment services provider. As an alternative, the customer's mobile device 104 may be a PDA with communication capabilities. In some embodiments, the customer's mobile device may initiate a payment transaction by interacting with a website operated by the payment services provider (represented by block 106 in FIG. 1).

In FIG. 1, blocks 108, 110 and 112 respectively represent the payment gateway, the open loop system payment authorization system and the merchant's acquirer FI, all as mentioned in the opening paragraphs of this "Detailed Description" section. The communication path by which the payment services provider 106 transmits the transaction request to the payment gateway 108 is indicated at 114. The transmitting of the authorization request from the payment gateway 108 to the payment authorization system 110 is schematically indicated at 116. The submission of the authorization request from the payment authorization system 110 to the acquirer FI 112 is indicated at 118. By the communication indicated at 120, the acquirer 112 submits the authorization request back to the payment authorization system 110. The communication indicated at 122 represents the authorization request being sent back to the payment gateway 108.

Communication path 124 in FIG. 1 is indicative of messaging from the payment gateway 108 to the merchant device 102 to provide notification that the transaction has been approved. An alternative pathway to perform the same function is represented by the combination of dashed line arrows 126 and 128. With the latter pathway, the notification to the merchant device 102 is relayed via the acquirer FI 112.

Details of the above transaction processing steps are provided below in conjunction with FIGS. 4A and 4B.

Each block shown in FIG. 1 should be understood to represent both a party to/entity involved in the transaction and one or more computer systems operated by the party/entity to generate and/or exchange data required for the transaction to take place. It should also be understood that the components shown in FIG. 1 may be part of a larger system capable of handling numerous transactions, including numerous simultaneous transactions. For example, the system 100 may include numerous merchant devices (operated by numerous merchants), numerous end-user mobile devices, and also a considerable number of acquirer FIs. Moreover, although only one payment services provider is represented in the drawing, in practice the payment gateway may interconnect several payment services providers to the open loop system.

Both the merchant device 102 and the customer mobile device 104 may be conventional in their hardware aspects. In many respects, the operation of these devices in accordance with aspects of this invention may resemble their operation as described in U.S. published patent application no. 2009/0094123, which is incorporated herein by reference. In particular, the merchant device 102 and the customer mobile device 104 of FIG. 1 herein may play roles that are rather similar to their roles in the transactions illustrated in FIG. 2 or FIG. 5 of the '123 published patent application. There are however importance differences between the transactions of this invention and the '123 published patent application, including the presence in this invention of the payment gateway 108 and also recording novel processes performed by the payment gateway, such as novel interactions between the payment gateway and the open loop payment system. Also, notably, in the transactions described in the '123 published payment application, an open loop system "payment transaction" is employed, whereas in the present invention the retail-customer-to-merchant transactions (described below in connection with FIGS. 4A/4B) employ open loop system "purchase transactions" (a distinction that will be well understood by those who are skilled in the art). By the same token, the retail-customer-to-merchant transactions in accordance with the present invention (as illustrated in FIGS. 4A/4B) involve an acquirer FI having a relationship with the merchant, whereas no acquirer FI is present in the transactions described in the '123 published patent application. (It is noted that the '123 published patent application has a common assignee and common inventors with the present application. Also note that the "payment services provider" referred to in the '123 published patent application is not a closed loop payment system operator and is in general very different from the closed loop payment system payment services provider represented by block 106 of FIG. 1 herein.)

Figure 2:
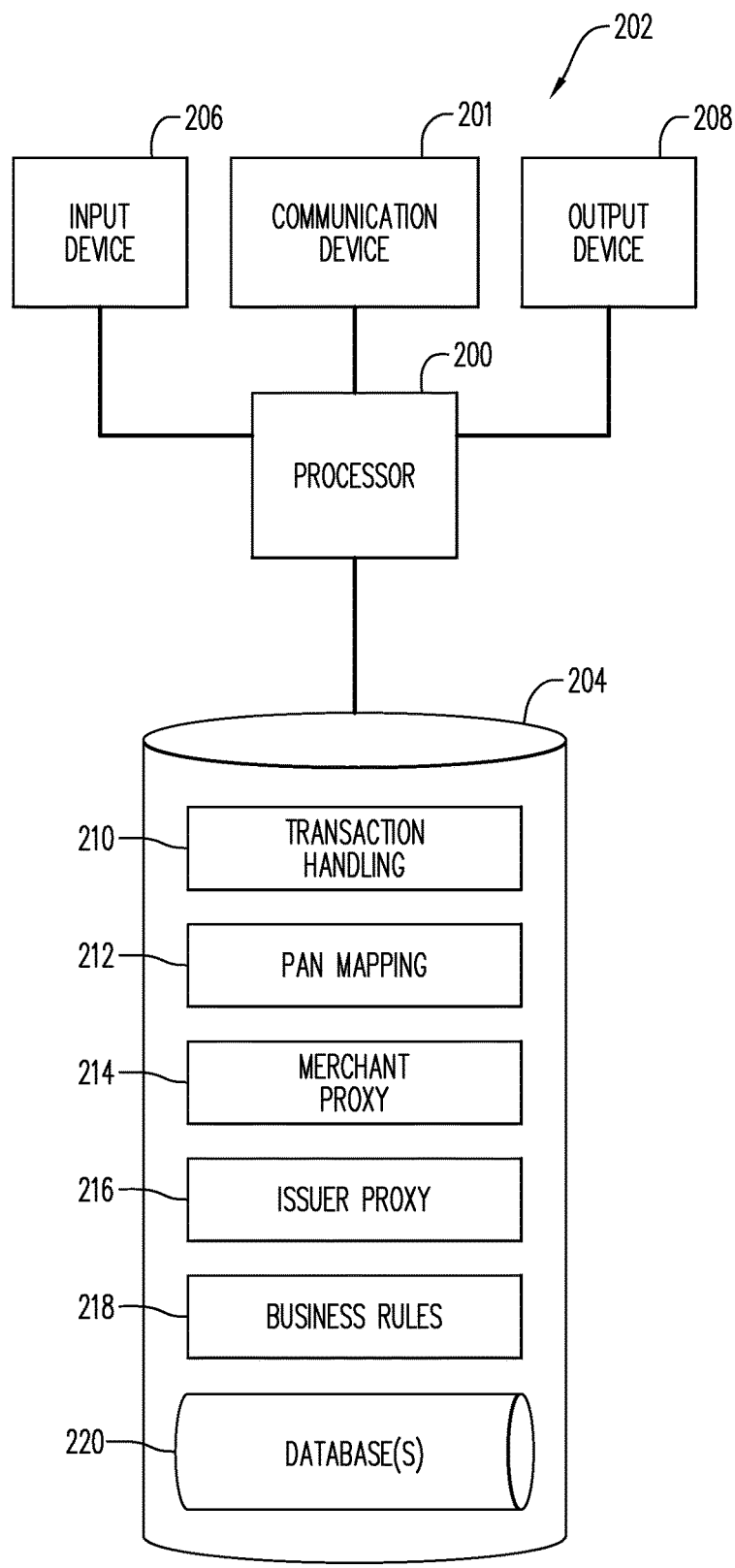
FIG. 2 is a block diagram representation of a computer that performs functions for interconnecting a closed loop payment system with an open loop payment system as part of the system of FIG. 1, and in accordance with aspects of the present invention.

FIG. 2 is a block diagram representation of a computer 202 which may perform some or all of the data processing functions to implement the payment gateway 108 shown in FIG. 1. Accordingly, the computer depicted in FIG. 2 may be referred to as the "payment gateway" computer.

The payment gateway computer 202 may be conventional in its hardware aspects but may be controlled by software to cause it to operate in accordance with aspects of the present invention.

The payment gateway computer 202 may include a computer processor 200 operatively coupled to a communication device 201, a storage device 204, an input device 206 and an output device 208.

The computer processor 200 may be constituted by one or more conventional processors. Processor 200 operates to execute processor-executable steps, contained in program instructions described below, so as to control the payment gateway computer 202 to provide desired functionality.

Communication device 201 may be used to facilitate communication with, for example, other devices (such as one or more computers that constitute the payment authorization system 110 (FIG. 1) or a computer operated by the payment services provider 106). Input device 7206 may comprise one or more of any type of peripheral device typically used to input data into a computer. For example, the input device 206 may include a keyboard and a mouse. Output device 208 may comprise, for example, a display and/or a printer.

Storage device 204 may comprise any appropriate information storage device, including combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices, as well as so-called flash memory.

Storage device 204 stores one or more programs for controlling processor 200. The programs comprise program instructions that contain processor-executable process steps of payment gateway computer 202, including, in some cases, process steps that constitute processes provided in accordance with principles of the present invention, as described in more detail below.

The programs may include an application 210 that is for handling individual transactions as described herein. Details of operation of the transaction handling application 210 will be discussed hereinbelow, particularly with reference to FIGS. 4A/4B, 5, and 8A/8B.

The storage device 204 may also store an application 212 for mapping "alias" customer identifiers (e.g., customer account numbers for the closed loop payment system) into the corresponding open loop system "shadow account" identifiers.

Another application that may be stored by the storage device 204 is indicated by block 214 and may perform functions whereby the payment gateway computer 202 serves in a "merchant proxy" role, as described herein. In addition, application program 216—also stored in storage device 204—may perform functions whereby the payment gateway computer 202 serves in an "issuer proxy" role, also as described herein.

The storage device 204 may also store an application program 218, which applies (and may also incorporate) one or more business rules by which the payment gateway computer 202 may determine whether to approve or decline individual transactions that are submitted to the payment gateway computer 202.

Reference numeral 220 in FIG. 2 identifies one or more databases that are maintained by the payment gateway computer 202 on the storage device 204. Among these databases may be a consumer account holder (shadow account) database, a merchant database, and a transaction database.

The application programs of the payment gateway computer 202, as described above, may be combined in some embodiments, as convenient, into one, two or more application programs. Moreover, the storage device 204 may store other programs, such as one or more operating systems, device drivers, database management software, web hosting software, etc.

Figure 3:
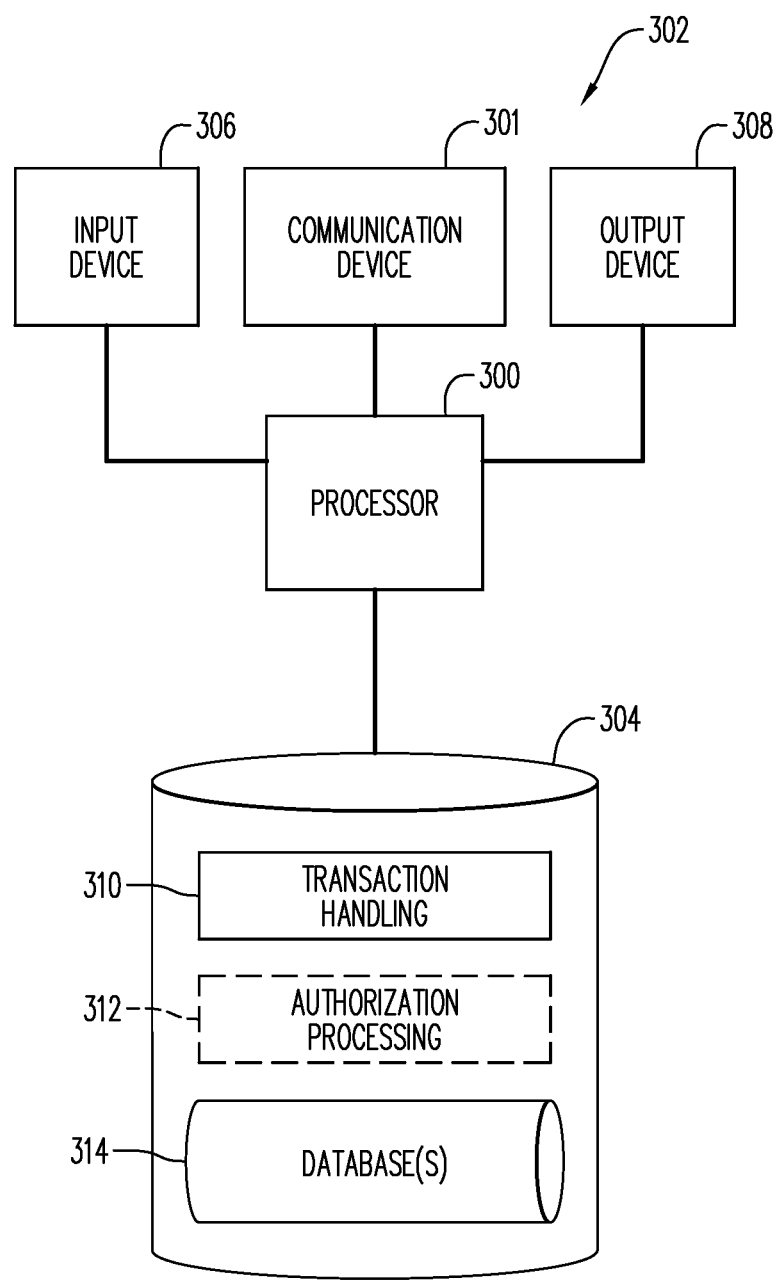
FIG. 3 is a block diagram representation of another computer that is part of the system of FIG. 1, the latter computer performing functions of the open loop payment system in accordance with aspects of the present invention.

FIG. 3 is a block diagram of a computer 302 that is operated to perform one or more functions of the payment authorization system 110 (FIG. 1). Accordingly, the computer 302 may be referred to as the "payment authorization system computer 302".

The hardware architecture of the payment authorization system computer 302 may be conventional and may be the same as that of the payment gateway computer 202. Thus, the above description of the hardware aspects of the payment gateway computer 202 is equally applicable to the hardware aspects of the payment authorization system computer 302. Nevertheless, the following description is provided to summarize the hardware components of the payment authorization system computer 302.

The payment authorization system computer 302 may include a processor 300 that is in communication with a communication device 301, a storage device 304, an input device 306 and an output device 308. The storage device 304 may store an application program 310 that controls the payment authorization system computer 302 for purposes of routing transactions (e.g., authorization requests and authorization responses) within the payment authorization system 110. Some aspects of the transaction routing application program 310 are described below in connection with FIG. 6.

Further, the storage device 304 may store (in some embodiments) an application program 312 that controls the payment authorization system computer 302 to make determinations as to whether to approve or decline individual transaction authorization requests.

Reference numeral 314 in FIG. 3 identifies one or more databases that are maintained by the payment authorization system computer 302 on the storage device 304. For example, the database(s) 314 may include a transaction database.

Moreover, the storage device 304 may store other programs, such as one or more operating systems, device drivers, web hosting software, etc.

Figure 4A:
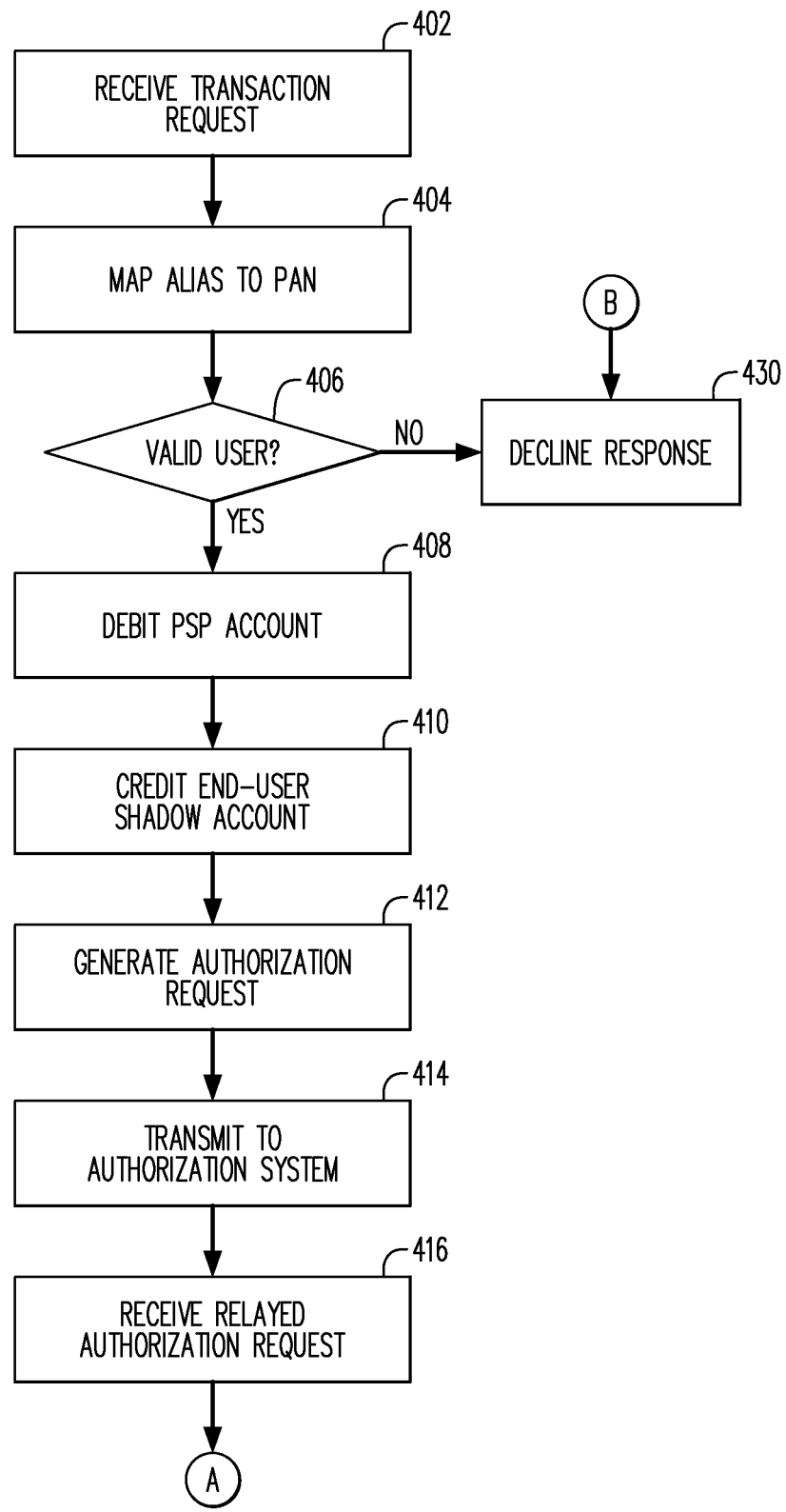
FIGS. 4A and 4B together form a flow chart that illustrates a process that may be performed in the system of FIG. 1.
Figure 4B:
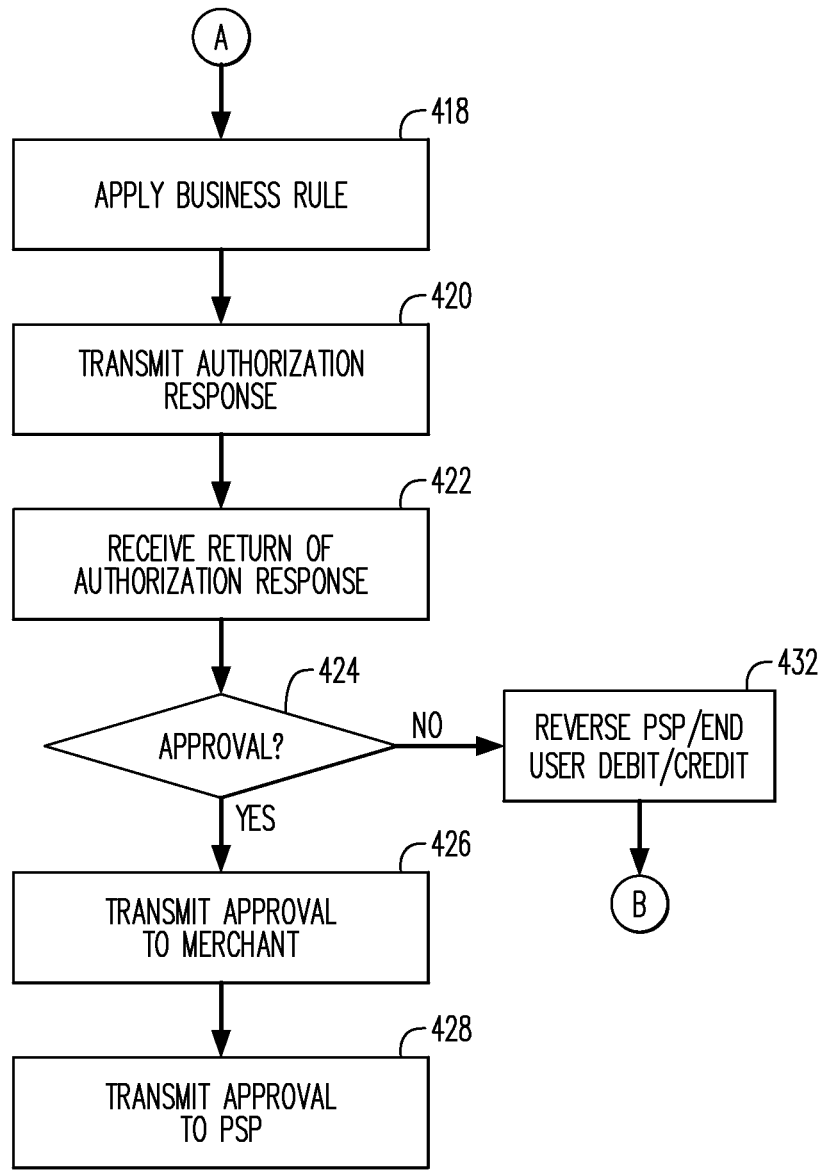

FIGS. 4A and 4B together form a flow chart that illustrates a process that may be performed in the system 100, and more particularly shows a process that may be performed in handling a transaction by the payment gateway computer 202. It is assumed that the purpose and function of the example transaction illustrated by FIGS. 4A/4B is to implement a purchase by a closed-loop account holder (end user) at a retail store operated by a merchant that is not a member of the closed-loop system. It is also assumed that the end user has been enrolled with the payment gateway 108 so as to have established a "shadow account" for purposes of open-loop system transactions as described herein. It is still further assumed that the end user operates a mobile device (e.g., device 104, FIG. 1) such as a mobile telephone that is programmed to aid in facilitating payment/purchase transactions via communications to the payment services provider 106 that operates the closed-loop payment system to which the end user subscribes.

Referring to FIG. 4A, the process begins at 402 with the payment gateway computer 202 receiving a request for a transaction from the payment services provider 106. The genesis for the transaction request may have been an interaction between the mobile device 104 and the merchant device 102 for the purpose of facilitating the end user's purchase of one or more items at the counter of a retail store where the merchant device 102 is located. As part of the interaction, the merchant device 102 may have communicated to the end user's mobile device 104 a total monetary amount (the transaction amount) due for the proposed purchase and an identifier that identifies the merchant for purposes of transactions conducted by the payment gateway 108 and/or the payment authorization system 110. In some embodiments, the identifier may also identify the merchant device 102, assuming that it is one of a number operated by the merchant. (Alternatively, a separate merchant device identifier may be provided in addition to the merchant identifier.) A suitable authentication/encryption protocol may protect the communication between the merchant device 102 and the mobile device 104. In some embodiments, the communication is via a short range communication protocol such as near field communication ("NFC"). In other cases, the communication to the mobile device may be via a mobile telephone network (not shown) to which the mobile device 104 subscribes (i.e., the merchant device 102 may send a mobile telephone system text message or other data message to the mobile device 104).

The end user, via the mobile device 104, may transmit a request for the transaction to the payment services provider 106. The request as received at the payment services provider 106 may include the merchant identifier/merchant device identifier, the transaction amount, and some form of identification of the end user. This may be, for example, the end user's closed-loop system account identifier (e.g., stored in and transmitted from the mobile device 104) and/or a mobile telephone system identifier for the mobile device, automatically provided by the mobile telephone system to the payment services provider.

Upon receiving the transaction request from the mobile device 104, the payment services provider 106 may generate the request that is to be sent to the payment gateway computer 202 (i.e., the request referred to at 402 in FIG. 4A). In doing so, the payment services provider 106, if necessary, may map the end user identifier to the end user's account number in the closed-loop payment system operated by the payment services provider 106. (This may not be necessary if (a) the request sent by the mobile device 104 included the end user's closed-loop payment system account number, or (b) operation of the payment gateway computer 202 is such that it accepts the end user's mobile device identifier as the "alias" identifier for the end user.)

It will be appreciated that authentication and encryption protocols may be included in the communication between the mobile device 104 and the payment services provider 106, and between the payment services provider 106 and the payment gateway computer 202.

Referring again to FIG. 4A, block 404 follows block 402. At block 404, the payment gateway computer 202 maps the end user's alias identifier (i.e., the end user's closed-loop system account number or the identifier associated with the end user's mobile device, as the case may be) into the account number for the "shadow account" assigned to the end user in the open-loop payment system. The open-loop system account number may be in the same format as a conventional credit or debit card account number—i.e., 16-19 digits as is the case for the leading open-loop payment systems.

Decision block 406 then follows block 404. At decision block 406, the payment gateway computer 202 determines whether the mapping operation at 404 resulted in a mapping into a valid end user open-loop system account number. (That is, the payment gateway computer 202 may determine whether the end user's alias identifier maps into a valid entry in an end user database stored in the payment gateway computer 202.) If the payment gateway computer 202 makes a positive determination at decision block 406 (i.e., if the payment gateway computer 202 determines that the alias identifier identifies a valid end user enrolled with the payment gateway), then block 408 follows decision block 406.

At block 408, the payment gateway computer 202 debits a stored value account (that stores funds belonging to the payment services provider 106) for the purchase transaction amount requested, and concurrently, at 410, the payment gateway computer 202 credits the purchase transaction amount to the end user's shadow account to support the proposed payment to the merchant in the open-loop system. Then, at 412, the payment gateway computer 202 generates a purchase transaction authorization request in accordance with the formatting requirements of the open loop system. For example, the format of the purchase transaction authorization request may comply with the standard known as "ISO 8583" and may include required data elements under that format, including merchant identifier, purchase transaction amount, and the account number (PAN—"primary account number") that identifies the end user's open-loop system shadow account. Next, at 414, the payment gateway computer 202 may transmit the authorization request to the payment authorization system 110. In doing so, the payment gateway computer 202 is acting as a proxy for the merchant.

In some embodiments, the payment authorization system 110 may operate such that it routes the authorization request from the payment gateway computer 202 to the acquirer 112 for the merchant. (Operation of the payment authorization system 110 in connection with the transaction is described in more detail below in connection with FIG. 6.) The acquirer 112 then forwards the authorization request to the payment authorization system 110 for routing to the entity that is to perform the issuer functions with respect to the authorization request. In accordance with aspects of the invention, that entity is the payment gateway 108/payment gateway computer 202. Accordingly, the payment authorization system 110 relays the authorization request back to the payment gateway computer 202, which now acts as a proxy for the issuer in determining whether the authorization request is to be approved or declined. Block 416 in FIG. 4A represents the payment gateway computer 202 receiving the authorization request back from the payment authorization system 110.

The end user's open-loop system shadow account has been credited with funds to cover the requested transaction, so it is highly unlikely that the transaction would need to be declined for reasons of insufficient funds. However, and as indicated at 418 in FIG. 4B, the payment gateway computer 202 may in some embodiments apply one or more business rules to determine whether there are other reasons to decline the transaction. (Alternatively, in some embodiments, the business rules—or some of them—may be applied at the payment authorization system 110 rather than at the payment gateway computer 202.) For example, one applicable business rule may prohibit payments to a certain class or classes of merchant, such as casinos or online gambling websites. Another applicable business rule may prescribe a "velocity" limit (i.e., a limit on the number of transactions for a given account within a predetermined period of time) and/or a limit on the total dollar amount of transactions within a predetermined period of time.

It may also be the case that the transaction may be declined due to a data mismatch, a format error, or lack of information in one or more required data fields.

Block 420 in FIG. 4B follows block 418. At block 420, the payment gateway computer 202 generates and transmits an authorization response to the payment authorization system 110. The authorization response may be in a conventional format for transaction authorization responses in an open-loop payment system, and accordingly indicates either that the authorization request is approved or that it is declined. The payment authorization system 110 then returns the authorization response to the payment gateway computer 202, which is now to act again as a proxy for the merchant. Block 422 represents the payment gateway computer 202 receiving the return of the authorization response from the payment authorization system 110.

At decision block 424, the payment gateway computer 202, acting as merchant proxy, determines whether the authorization response indicates approval of the transaction authorization request. If so, then block 426 follows decision block 424. At 426, the payment gateway computer 202 transmits the approval to the merchant device 102. This may occur directly, or indirectly via the merchant's acquirer 112 and/or a merchant transaction processing system (not shown). Further, at 428, the payment gateway computer 202 transmits to the payment services provider 106 an indication that the transaction has been approved.

Upon receipt of the approval message at the merchant device 102, the purchase transaction may be consummated, and the end user permitted to leave the retail store with his/her purchase. The payment services provider 106, upon being notified of the approval of the transaction by the payment gateway computer 202, may implement or finalize a charge to the end user's closed-loop system account for the amount of the purchase. In addition, the payment services provider 106 may transmit a message to the end user's mobile device 104 to notify the end user that the payment transaction has been completed.

Referring again to decision block 406 in FIG. 4A, if a negative determination is made at that decision block (i.e., if the end user alias does not map into a valid open-loop system shadow account number), then the payment gateway computer 202 may generate a "decline transaction" response, as indicated at 430 in FIG. 4A. The payment gateway computer 202 may send suitable messages to indicate the transaction is declined to the payment services provider 106 and/or to the merchant device 102.

Referring again to decision block 424 in FIG. 4B, if a negative determination is made at that decision block (i.e., if the authorization response indicates that the authorization request has been declined), then block 432 (FIG. 4B) follows decision block 424. At block 432, the processing of blocks 408 and 410 is reversed, so that the transaction amount is debited from the end-user open-loop system shadow account and credited back to the value store account for the payment services provider 106. The process then advances from block 432 in FIG. 4B to block 430 in FIG. 4A, such that the payment gateway computer 202 sends out "transaction declined" messages to the payment services provider 106 and/or to the merchant/merchant's acquirer.

Figure 5:
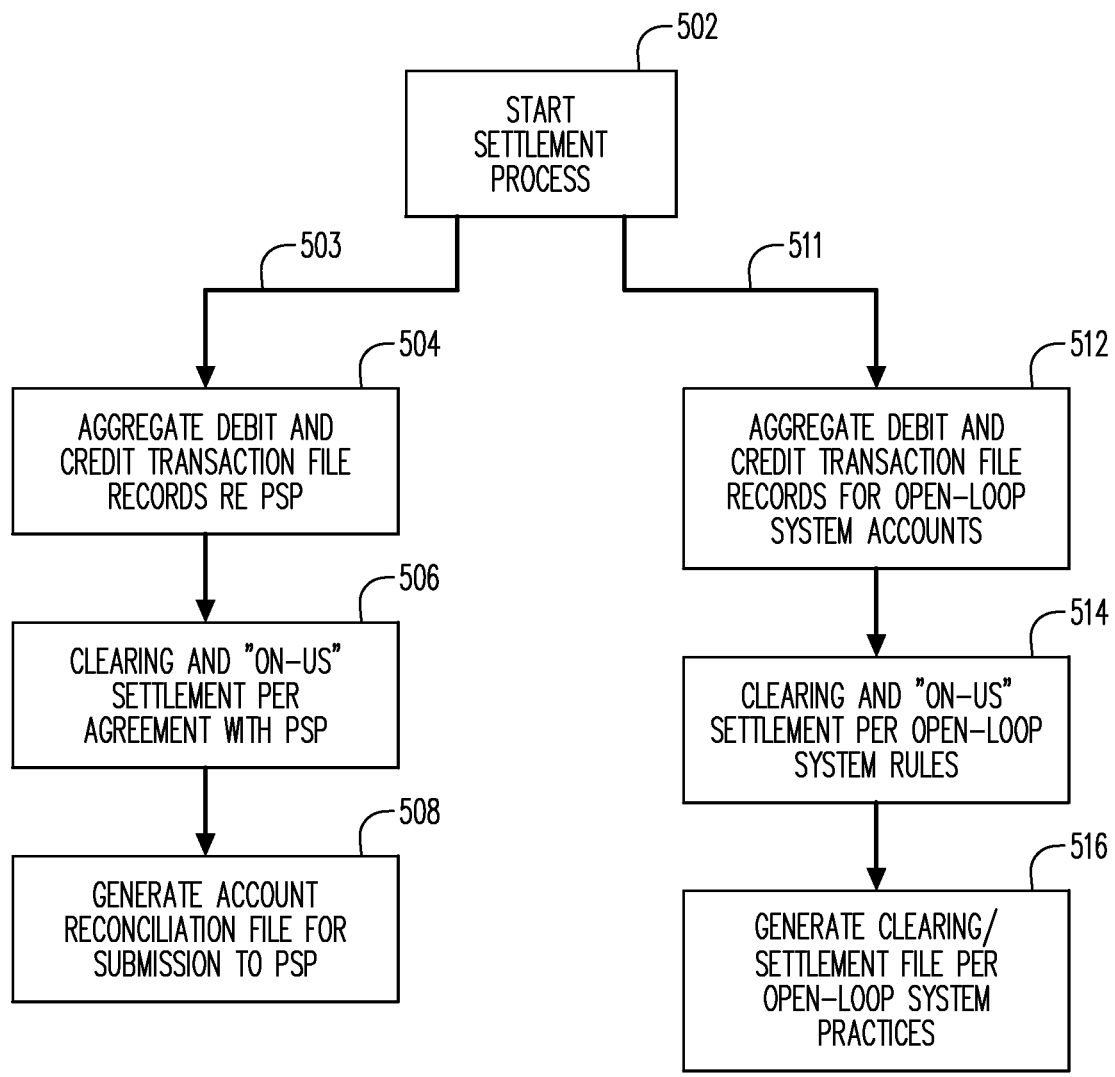
FIG. 5 is a flow chart that illustrates another process that may be performed in the system of FIG. 1.

FIG. 5 is a flow chart that illustrates a settlement process in the system 100 for the transaction illustrated in FIGS. 4A/4B.

Block 502 indicates the beginning of the settlement process. This may occur at the end of a business day and/or at predetermined points in time during the day. Branch 503 from block 502 leads to block 504. At block 504, the payment gateway computer 202 aggregates debit and credit file records based on the master transaction account for the payment services provider 106 and based on individual end user accounts for subscribers to the payment services provider 106. Then, at 506, the payment gateway computer 202 performs a clearing and "on-us" settlement in accordance with a process that has previously been agreed upon between the payment services provider 106 and the payment gateway 108.

At 508, the payment gateway computer 202 generates an account reconciliation file that details the clearing and settlement activity at 506, and sends the account reconciliation file to the payment services provider 106 for processing and any needed reconciliation by the payment services provider 106.

Branch 511 from block 502 leads to block 512. At block 512, the payment gateway computer 202 aggregates shadow account debit and credit transactions according to open-loop system practices. At block 514, the payment gateway computer 202 performs clearing and "on-us" settlement processes in accordance with the business rules for the open-loop payment system. At 516, the payment gateway computer 202 generates a clearing/settlement file that details the clearing and settlement activity at 514 in accordance with business rules and standards for the open-loop system, and sends the clearing/settlement file to the open-loop network for processing in a conventional manner.

Figure 6:
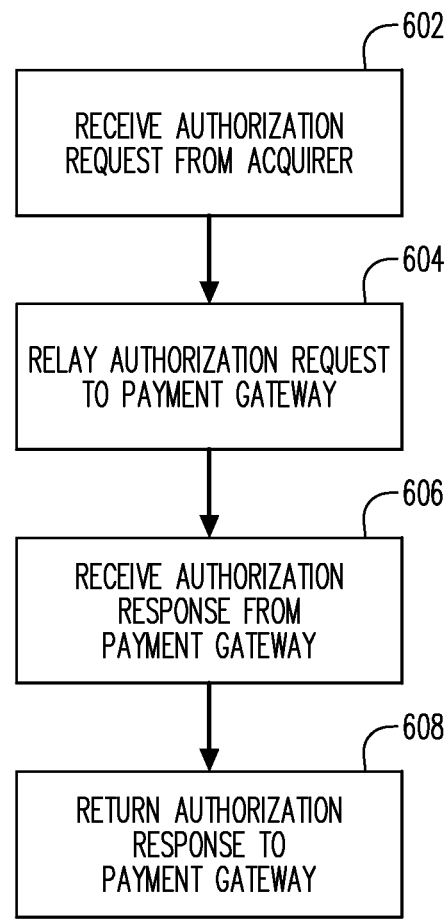
FIG. 6 is a flow chart that illustrates still another process that may be performed in the system of FIG. 1.

FIG. 6 is a flow chart that illustrates operation of the payment authorization system computer 302 (FIG. 3) in connection with the transaction illustrated in FIGS. 4A/4B.

At 602, the payment authorization system computer 302 receives the authorization request (generated by the payment gateway computer 202 at 412 in FIG. 4A) from the merchant's acquirer 112. At 604, the payment authorization system computer 302 relays the authorization request to the payment gateway computer 202 so that the payment gateway computer 202 can serve as issuer proxy for the transaction authorization request. At 606, the payment authorization system computer 302 receives the transaction authorization response which was transmitted by the payment gateway computer 202 (at 420 in FIG. 4B). At 608, the payment authorization system computer 302 returns the payment authorization response to the payment gateway computer 202 so that the payment gateway computer 202 can serve as a merchant proxy in receiving the authorization response.

In the transaction processes described above in connection with FIGS. 4A/4B, 5 and 6, an end user's closed-loop payment system account is used for payment to a merchant that does not subscribe to the closed-loop system. The transaction is implemented via an open-loop payment system for which the merchant is enrolled as a transaction acceptor. A payment gateway provides an interface between the closed-loop system and the open-loop system and imports funding for the transaction from the closed-loop system to the open-loop system. With routing of the transaction via the merchant's acquirer, and with the payment gateway serving as both merchant proxy and issuer proxy, payment to the merchant is facilitated through the merchant's acquirer and conventional functionality of the open-loop system for charge-backs (when required), accounting, reconciliation, dispute management and exception management are all brought into play as needed.

A cooperating bank may serve as the issuer for the shadow accounts to which transactions are charged by the payment gateway. Alternatively, the payment gateway itself may serve as issuer. In some embodiments, the payment gateway may be affiliated with and/or operated by the network operator for the open-loop payment system. In some embodiments, the payment services provider may serve as the issuer of the shadow accounts. The end users may enroll directly on an individual basis with the payment gateway, or may be enrolled en masse for shadow accounts by the payment services provider. In some embodiments, the end users are not issued payment cards to access the shadow account and in fact can only use the shadow account via transaction requests made to the payment services provider. Accordingly, the end user may not receive any statement concerning the shadow account apart from the statements rendered to the end user by the payment services provider for the end user's closed-loop system account. In short, the shadow account may function only as a conduit for payments originating from the end-user's closed-loop system account into the open-loop payment system.

In other embodiments, the shadow account may also serve as a fully functioning credit or debit card account.

Figure 7:
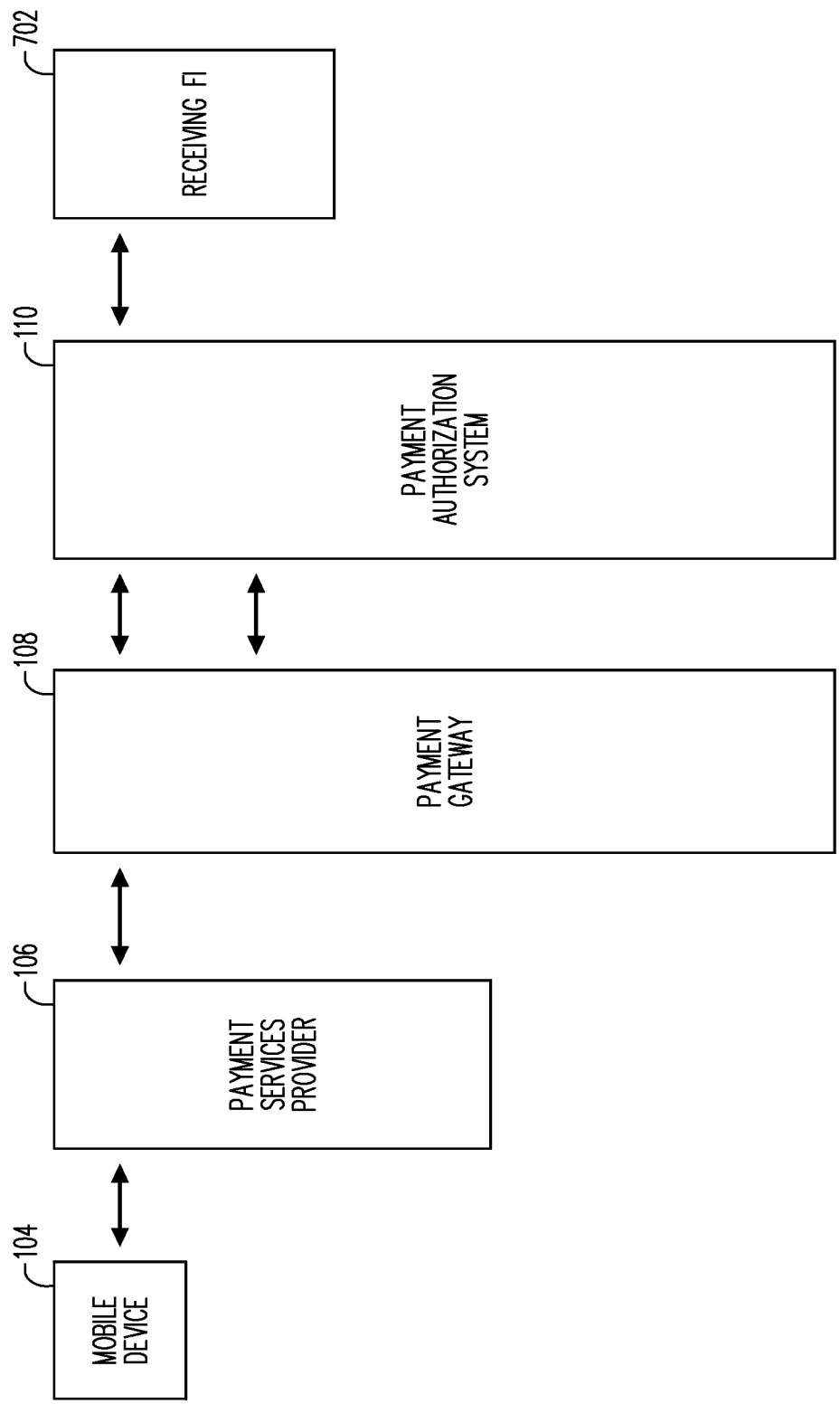
FIG. 7 is an alternative block diagram representation of the transaction-handling system of FIG. 1.

FIG. 7 is an alternative block diagram representation of the transaction-handling system 100 shown in FIG. 1. FIG. 7 represents additional functionality of the system 100 such that the system 100 supports person-to-person remittances in addition to customer-to-merchant payments as discussed above in connection with FIGS. 1, 4A/4B, 5 and 6. For a somewhat more general discussion of person-to-person remittances, reference is made to U.S. published patent application no. 2008/0249929, which has common inventors and is commonly assigned herewith. (The '929 published patent application is incorporated herein by reference.) It is assumed for purposes of the remittance transaction illustrated in FIG. 7 (and also for purposes of the discussion below of FIGS. 8A/8B) that the intended recipient of the remittance holds an open-loop system payment card account but is not a subscriber to the closed-loop payment system operated by the payment services provider that is represented in FIG. 7 (as in FIG. 1) by block 106. As in the case of FIG. 1, the system components shown in FIG. 7 are those that operate with respect to a single transaction, with the system 100 being constituted by numerous additional components as well.

As in FIG. 1, block 104 in FIG. 7 represents a mobile device (e.g., a mobile telephone) operated by an individual end user who is a subscriber of the payment services provider 106. For the remittance transaction, the end user may operate the mobile device 104 to communicate with the payment services provider 106 to initiate the remittance transaction. Blocks 108 and 110 again represent, respectively, the payment gateway and the open-loop system payment authorization system. Block 702 in FIG. 7 represents the financial institution (FI) which is the issuer of the open-loop system payment card account that belongs to the recipient for the remittance transaction.

Reference numerals 703, 704, 706 and 708 represent communication paths between the system components involved in the transaction in question. Details of the communications exchanged among the system components will be described below in conjunction with FIG. 8.

Again, as was the case with FIG. 1, each block shown in FIG. 7 should be understood to represent both a party to/entity involved in the remittance transaction and one or more computer systems operated by the party/entity to generate and/or exchange data required for the remittance transaction to take place.

Figure 8:
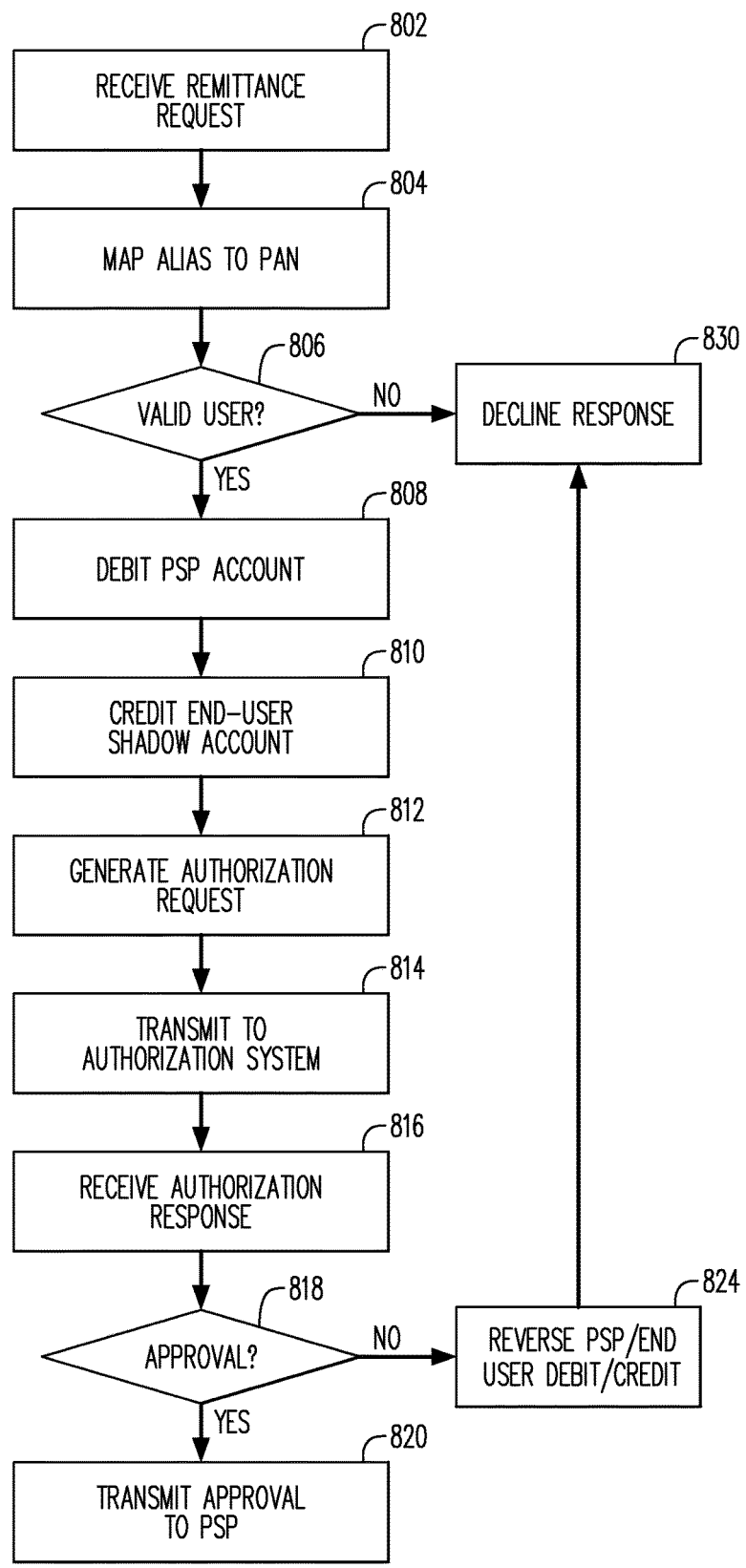
FIG. 8 is a flow chart that illustrates another process that may be performed in the system of FIGS. 7/1.

FIG. 8 is a flow chart that illustrates a process that may be performed in the system 100 to implement the remittance transaction mentioned above in connection with FIG. 7. More particularly, FIG. 8 shows a process that may be performed in handling the transaction by the payment gateway computer 202, serving as a functional component of the payment gateway 108 shown in FIG. 7.

It is assumed for purposes of FIG. 8 that the remittance sender/end user has previously operated his/her mobile device 104 (FIG. 7) to transmit to the payment services provider 106 a request for a remittance transaction to be funded from the sender's closed-loop system account. The request as received at the payment services provider 106 may include the amount of the remittance (transaction amount), information that identifies the remittance recipient, and some form of identification of the sender. The latter information may be, for example, the sender's closed-loop system account identifier (e.g., stored in and transmitted from the mobile device 104 and/or a mobile telephone system identifier for the mobile device, automatically provided by the mobile telephone system to the payment services provider). The request from the sender to the payment services provider 106 may identify the recipient by the recipient's open-loop system payment card account or by an alias identifier such as the recipient's mobile telephone number. In still other embodiments, the sender may access a profile that the sender has previously stored with the payment services provider 106 to facilitate remittances and may select the recipient from among one or more proposed remittance recipients stored in the sender's profile.

Upon receiving the remittance transaction request from the mobile device 104, the payment services provider 106 may generate a request for the remittance transaction for transmission from the payment services provider 106 to the payment gateway computer 202. (Receipt by the payment gateway computer 202 of the remittance transaction request from the payment services provider 106 is indicated at block 802 in FIG. 8.) In generating the remittance transaction request, the payment services provider 106, if necessary, may map the identifier for the sender/end user to the end user's account number in the closed-loop payment system operated by the payment services provider 106. (This may not be necessary if (a) the remittance request send by the mobile device 104 included the end user's closed loop payment system account number, or (b) operation of the payment gateway computer 202 is such that it accepts the sender's mobile device identifier as the "alias" identifier for the sender.)

It will be appreciated that authentication and encryption protocols may be included in the communication between the mobile device 104 and the payment services provider 106, and between the payment services provider 106 and the payment gateway computer 202.

Referring again to FIG. 8, block 804 follows block 802. At block 804, the payment gateway computer 202 maps the sender's alias identifier (i.e., the sender's closed-loop system account number or the identifier associated with the sender's mobile device, as the case may be) into the account number for the "shadow account" assigned to the sender in the open-loop payment system.

Decision block 806 then follows block 804. At decision block 806, the payment gateway computer 202 determines whether the mapping operation at 804 resulted in a mapping into a valid end user open-loop system account number. (That is, the payment gateway computer 202 may determine whether the sender's alias identifier maps into a valid entry in the end user database stored in the payment gateway computer 202.) If the payment gateway computer 202 makes a positive determination at decision block 806 (i.e., if the payment gateway computer 202 determines that the alias identifier identifies a valid end user enrolled with the payment gateway), then block 808 follows decision block 806.

At block 808, the payment gateway computer 202 debits a stored value account (that stores funds belonging to the payment services provider 106) for the remittance transaction amount requested, and concurrently, at 810, the payment gateway computer 202 credits the remittance transaction amount to the sender's shadow account to support the proposed funds transfer to the recipient of the remittance amount. Then, at 812, the payment gateway computer 202 generates an authorization request for an open-loop system payment transaction. As used in this paragraph, the term "payment transaction" is a term of art used in connection with open-loop payment systems and has the same meaning as discussed in paragraph 0085 of the above-referenced '929 published patent application. The authorization request may be in a format that complies with the standard known as "ISO 8583" and may include required data elements under that format, including payment transaction amount and the payment card account number (PAN) for the open-loop system payment card account to which the funds transfer is to be made. (If required, the payment gateway computer 202 may have previously mapped the recipient's alias identifier to the recipient's PAN; alternatively, the request received by the payment gateway computer 202 may have included the recipient's PAN.) Next, at 814, the payment gateway computer 202 may transmit the payment transaction authorization request to the payment authorization system 110. In doing so, the payment gateway computer 202 is acting as an originating financial institution for the payment transaction.

The payment authorization system 110 then routes the authorization request to the receiving FI 702 (FIG. 7), in accordance with conventional practices and business rules. The receiving FI 702 processes the authorization request in a conventional manner (typically for the purpose of determining whether the recipient PAN included in the request is valid) and then transmits an authorization response to approve or decline the authorization request. (In some embodiments, the receiving FI 702, payment gateway computer 202 or another entity shown in FIG. 7 may also apply business rules—e.g., velocity rules—to determine whether the requested remittance is permitted.) The authorization response is then routed from the receiving FI 702, via the payment authorization system 110 to the payment gateway computer 202. Receipt of the authorization response by the payment gateway computer 202 is indicated at 816 in FIG. 8.

Decision block 818 in FIG. 8 follows block 816. At decision block 818, the payment gateway computer 202 determines whether the authorization response indicates that the remittance/payment transaction authorization request has been approved. If so, then block 820 follows decision block 818. At block 820, the payment gateway computer 202 transmits to the payment services provider 106 an indication that the remittance transaction has been approved. The payment services provider 106, upon being notified by the payment gateway computer 202 of the approval of the remittance transaction, may transmit a message to the sender's mobile device 104 to notify the sender that the remittance transaction has been completed. In some embodiments, the sender and/or another entity involved in the remittance transaction may notify the recipient that the funds transfer has occurred.

Referring again to decision block 806 in FIG. 8, if a negative determination is made at that decision block (i.e., if the sender's alias does not map to a valid open-loop system shadow account number), then the payment gateway computer 202 may generate a "decline transaction" response, as indicated at 822 in FIG. 8. The payment gateway computer 202 may send the decline response to the payment services provider 106.

Referring again to decision block 818 in FIG. 8, if a negative determination is made at that decision block (i.e., if the authorization response indicates that the payment transaction authorization request has been declined), then block 824 follows decision block 818. At block 824, the processing of blocks 808 and 810 is reversed, so that the remittance transaction amount is debited from the sender's open-loop system shadow account and credited back to the value store account for the payment services provider 106. The process then advances from block 824 to block 822, such that the payment gateway computer 202 sends a "transaction declined" response to the payment services provider 106.

Settlement of the payment transaction which implements the requested remittance may proceed essentially as described above in connection with FIG. 5.

In some embodiments, the remittance recipient may be a merchant with whom the remittance sender is dealing for a retail purchase transaction, and the remittance transaction may implement the payment for the purchase transaction, in a manner akin to the transaction illustrated in FIG. 9 of the above-referenced '123 published patent application.

It was noted above that the system 100 may include more than one payment services provider linked to the open-loop system via the payment gateway. In some embodiments, end users may have accounts in more than one closed-loop system, and all of the end user's closed-loop system accounts may be mapped by the payment gateway into a single open-loop system shadow account.

In some embodiments, open-loop system transactions to be charged to an end user's closed-loop system account may be initiated by a merchant using the end user's closed-loop system account number as an alias for the end user's open-loop system PAN. Such a transaction, for example, may involve routing an authorization request from the merchant to the acquirer, and then from the acquirer to the payment gateway for mapping the alias to the end user's PAN. The payment gateway may also obtain the necessary funds for the transaction, for crediting to the end user's open-loop system shadow account, from the payment services provider.

The payment gateway may also, in some embodiments, facilitate bill payments from end users' closed-loop system accounts to the billing entities via the open-loop payment system.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

The flow charts and descriptions thereof herein should not be understood to prescribe a fixed order of performing the method steps described therein. Rather the method steps may be performed in any order that is practicable.

As used herein and in the appended claims, the term "payment card account" includes a credit card account or a deposit account that the account holder may access using a debit card. The term "payment card account number" includes a number that identifies a payment card account or a number carried by a payment card, or a number that is used to identify an account in a payment system that handles debit card and/or credit card transactions or to route a transaction in a payment system that handles debit card and/or credit card transactions. The term "payment card" includes a credit card or a debit card (including a pre-paid debit card). The term "payment card account" also includes an account to which a payment card account number is assigned. Thus a payment card account may include an account to which payment transactions may be routed by a payment system that handles debit card and/or credit card transactions, even if the account in question is not eligible to be charged for purchase transactions or other transactions. A payment card account may also include an account from which payment transactions may be routed by a payment system that handles debit card and/or credit card transactions, even if the account in question is not customarily used, or is not eligible, to be charged for purchase transactions.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method for providing person-to-person and person-to-merchant remittances, comprising:

receiving, by a payment gateway computer, a remittance transaction request from a payment services provider (PSP) computer associated with a closed-loop system, the remittance transaction request comprising an alias identifier associated with a closed-loop account of the sender, a remittance transaction amount, and a primary account number (PAN) associated with an open-loop payment card account of a recipient;

mapping, by the payment gateway computer, the alias identifier into a shadow account number assigned to the sender in an open-loop payment authorization system;

determining, by the payment gateway computer, that the alias identifier mapped into a valid shadow account number;

debiting, by the payment gateway computer, a stored value account for the remittance transaction amount, the stored value account storing funds associated with the PSP computer;

crediting, by the payment gateway computer, a shadow account in the open-loop payment authorization system identified by the shadow account number for the remittance transaction amount, the shadow account established by the sender with the open-loop payment authorization system to support remittance transactions from the sender's closed-loop system to the open-loop system;

generating, by the payment gateway computer, an authorization request for an open-loop payment transaction comprising the remittance transaction amount and the PAN of the recipient;

transmitting, by the payment gateway computer acting as an originating financial institution, the payment transaction authorization request to the open-loop payment authorization system;

receiving, by the payment gateway computer from the open-loop payment authorization system, an authorization response indicating that the remittance transaction has been approved; and transmitting, by the payment gateway computer to the PSP computer, an approval response.

2. The method of claim 1, further comprising:
receiving, by the PSP computer, the approval response; and
transmitting, by the PSP computer to a mobile device of the sender, a message indicating that the remittance transaction has been completed.

3. The method of claim 1, further comprising, prior to mapping the alias identifier into a shadow account identifier:
applying, by the payment gateway computer, at least one business rule including a velocity rule limiting a number of transactions within a predetermined period for the payment card system account; and
determining, based on the at least one business rule, to permit further processing of the remittance transaction request.

4. The method of claim 1, further comprising, prior to mapping the alias identifier into a shadow account identifier:
applying, by the payment gateway computer, at least one business rule including a velocity rule limiting a number of transactions within a predetermined period for the payment card system account;
determining, based on the at least one business rule, to prevent further processing of the remittance transaction request; and
transmitting, by the payment gateway computer to the PSP computer, a remittance transaction request denied message.

5. The method of claim 1, further comprising, after mapping the alias identifier into a shadow account number:
determining, by the payment gateway computer, that the alias identifier mapped to an invalid shadow account number in a sender database;
generating, by the payment gateway computer, a decline transaction response; and
transmitting, by the payment gateway computer to the PSP computer, the decline transaction response.

6. The method of claim 5, further comprising:
receiving, by the PSP computer, the decline transaction response; and
transmitting, by the PSP computer to a mobile device of the sender, a message indicating that the remittance transaction has been declined.

7. The method of claim 1, further comprising, after transmitting the payment transaction authorization request:
receiving, by the payment gateway computer from the open-loop payment authorization system, an authorization response indicating that the remittance transaction has been declined;
debiting, by the payment gateway computer, the remittance transaction amount from the shadow account in the open-loop payment authorization system identified by the shadow account number; and
crediting, by the payment gateway computer, the remittance transaction amount to the stored value account associated with the PSP computer.

8. The method of claim 7, further comprising:
generating, by the payment gateway computer, a decline transaction response; and
transmitting, by the payment gateway computer to the PSP computer, the decline transaction response.

9. The method of claim 8, further comprising:
receiving, by the PSP computer, the decline transaction response; and
transmitting, by the PSP computer to a mobile device of the sender, a message indicating that the remittance transaction has been declined.

10. A non-transitory computer readable medium storing instructions configured to cause a payment gateway computer to:
receive a remittance transaction request from a payment services provider (PSP) computer associated with a closed-loop system, the remittance transaction request comprising an alias identifier associated with a closed-loop account of the sender, a remittance transaction amount, and a primary account number (PAN) associated with an open-loop payment card account of a recipient;
map the alias identifier into a shadow account number assigned to the sender in an open-loop payment authorization system;
determine that the alias identifier mapped into a valid shadow account number;
debit a stored value account for the remittance transaction amount, the stored value account storing funds associated with the PSP computer;
credit a shadow account in the open-loop payment authorization system identified by the shadow account number for the remittance transaction amount, the shadow account established by the sender with the open-loop payment authorization system to support remittance transactions from the sender's closed-loop system to the open-loop system;
generate an authorization request for an open-loop payment transaction comprising the remittance transaction amount and the PAN of the recipient;
transmit the payment transaction authorization request to the open-loop payment authorization system;
receive an authorization response from the open-loop payment authorization system, the authorization response indicating that the remittance transaction has been approved; and
transmit an approval response to the PSP computer.

11. The non-transitory computer readable medium of claim 10, further comprising, prior to the instructions for mapping the alias identifier into a shadow account number, instructions configured to cause the payment gateway computer to:
apply at least one business rule including a velocity rule limiting a number of transactions within a predetermined period for the payment card system account; and
determine, based on the at least one business rule, to permit further processing of the remittance transaction request.

12. The non-transitory computer readable medium of claim 10, further comprising, prior to the instructions for mapping the alias identifier into a shadow account number, instructions configured to cause the payment gateway computer to:
apply at least one business rule including a velocity rule limiting a number of transactions within a predetermined period for the payment card system account;
determine, based on the at least one business rule, to prevent further processing of the remittance transaction request; and
transmit a remittance transaction request denied message to the PSP computer.

13. The non-transitory computer readable medium of claim 10, further comprising, subsequent to the instructions for mapping the alias identifier into a shadow account number, instructions configured to cause the payment gateway computer to:
determine that the alias identifier mapped to an invalid shadow account number in a sender database;

generate a decline transaction response; and transmit the decline transaction response to the PSP computer.

14. The non-transitory computer readable medium of claim 10, further comprising, subsequent to the instructions for transmitting the payment transaction authorization request, instructions configured to cause the payment gateway computer to:

receive an authorization response from the open-loop payment authorization system, the authorization response indicating that the remittance transaction has been declined;

debit the remittance transaction amount from the shadow account in the open-loop payment authorization system identified by the shadow account number; and credit the remittance transaction amount to the stored value account associated with the PSP computer.

15. The non-transitory computer readable medium of claim 14, further comprising instructions configured to cause the payment gateway computer to:

generate a decline transaction response; and transmit the decline transaction response to the PSP computer.

16. A remittance system comprising:

a customer mobile device;

a payment services provider (PSP) computer associated with a closed-loop system, the PSP computer configured for communications with the customer mobile device;

a payment gateway computer comprising a processor, a communication device and a storage device, the payment gateway computer configured for communications with the PSP computer; and an open-loop payment authorization system configured for communications with the payment gateway computer;

wherein the storage device of the payment gateway computer stores instructions configured to cause the processor to:

receive a remittance transaction request from the PSP computer associated with a closed-loop system, the remittance transaction request comprising an alias identifier associated with a closed-loop account of the sender, a remittance transaction amount, and a primary account number (PAN) associated with an open-loop payment card account of a recipient;

map the alias identifier into a shadow account number assigned to the sender in the open-loop payment authorization system;

determine that the alias identifier mapped into a valid shadow account number;

debit a stored value account for the remittance transaction amount, the stored value account storing funds associated with the PSP computer;

credit a shadow account in the open-loop payment authorization system identified by the shadow account number for the remittance transaction amount to support the proposed remittance transaction;

generate an authorization request for an open-loop payment transaction comprising the remittance transaction amount and the PAN of the recipient;

transmit the payment transaction authorization request to the open-loop payment authorization system;

receive an authorization response from the open-loop payment authorization system indicating that the remittance transaction has been approved; and transmit an approval response to the PSP computer.

* * * * *